Figure 3:
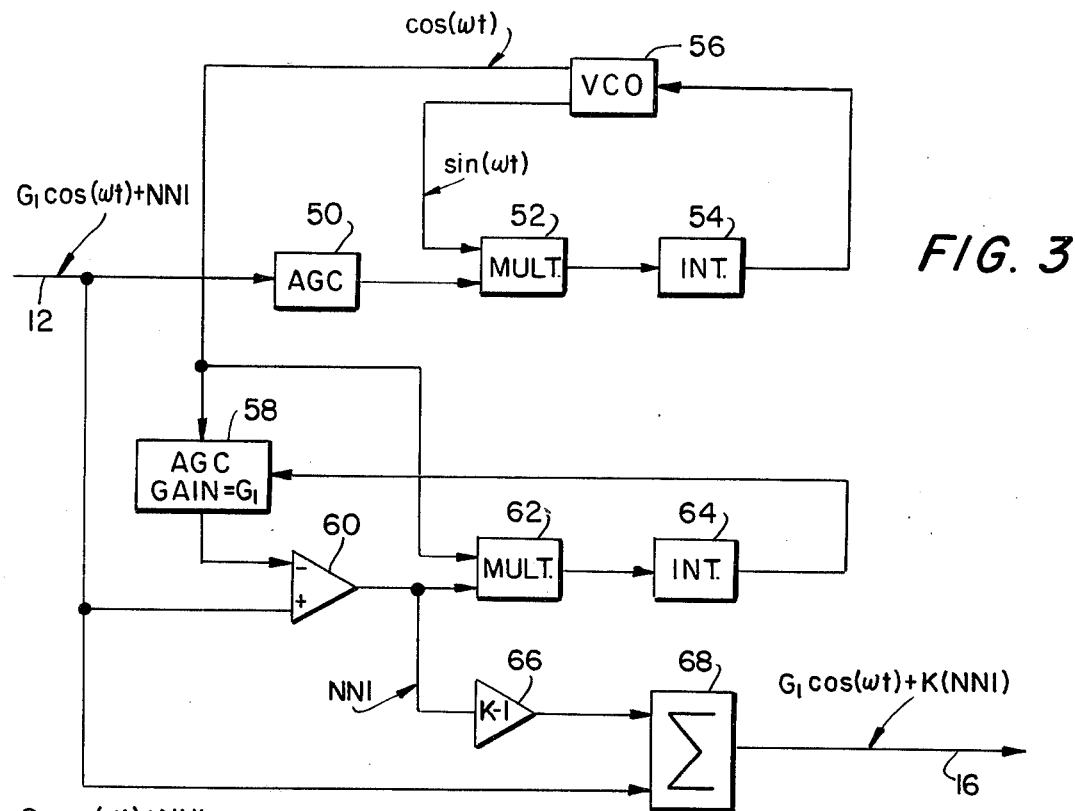

United States Patent [19]

Bradley

[11] 4,021,625
[45] May 3, 1977

[54] INSTRUMENTS AND METHODS FOR MEASURING CHARACTERISTICS OF ONLY A SELECTED PORTION OF A TRANSMISSION CHANNEL

[76] Inventor: Frank R. Bradley, 9 Dash Place, Bronx, N.Y. 10463

[22] Filed: Feb. 25, 1976

[21] Appl. No.: 661,106

[52] U.S. Cl. .................. 179/175.3 R; 324/57 N
[51] Int. Cl.² .................................. H04B 3/46
[58] Field of Search .......... 179/175.3 R; 324/57 N; 325/363

[56] References Cited
UNITED STATES PATENTS

| | | | |
|---|---|---|---|
| 1,869,515 | 8/1932 | Shanck | 179/175.3 R |
| 3,814,868 | 6/1974 | Bradley | 179/175.3 R |
| 3,836,735 | 9/1974 | Bradley | 179/175.3 R |
| 3,920,935 | 11/1975 | Vierling et al. | 179/175.3 R |

*Primary Examiner*—Douglas W. Olms
*Attorney, Agent, or Firm*—Gottlieb, Rackman, Reisman

[57] ABSTRACT

There are disclosed instruments and methods for measuring the characteristics of only a selected portion of an overall transmission channel. A test tone is transmitted from a test site to a remote facility over a path to be tested, and the received signal is transmitted back to the test site over a return path. Under ordinary circumstances, it is not possible to distinguish at the test site between the distortions which arose during the forward and return transmissions. In accordance with the invention, apparatus is inserted at the remote facility which amplifies the received noise relative to the test tone. Although additional noise is introduced in the return path, it is usually insignificant relative to the amplified forward-path noise. The apparatus at the remote facility preserves the test tone and re-transmits it back to the test site because the test tone is required at the test site; several important measurements are dependent upon the phase and amplitude of the impairments relative to the tone in the signal received at the remote facility.

49 Claims, 5 Drawing Figures

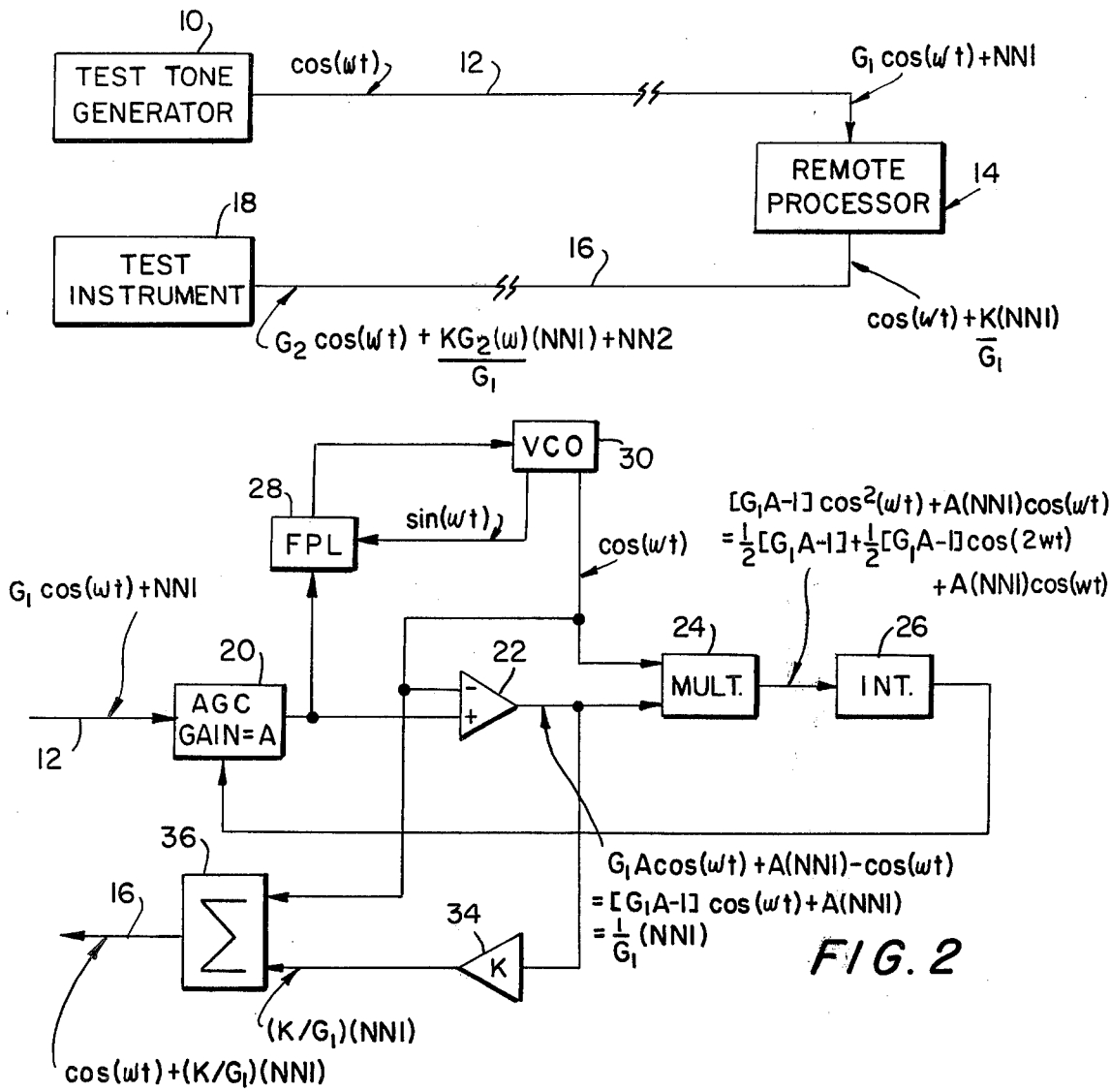
FIG. 1
FIG. 2
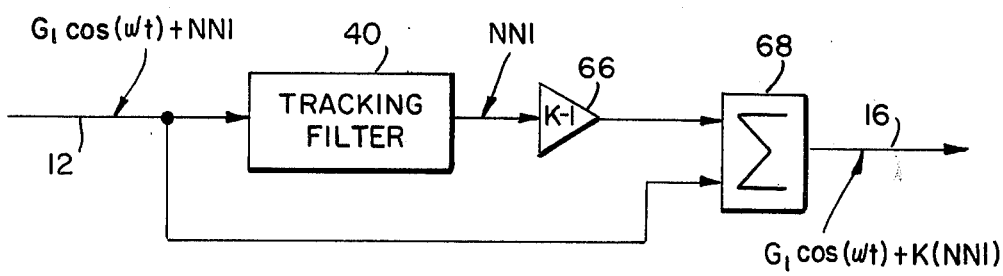
FIG. 4

INSTRUMENTS AND METHODS FOR MEASURING CHARACTERISTICS OF ONLY A SELECTED PORTION OF A TRANSMISSION CHANNEL

This invention relates to the testing of transmission facilities, and more particularly to apparatus and methods for determining the characteristics of only a selected portion of a transmission channel.

One standard technique for testing a telephone transmission channel is to transmit a test tone on the channel and to analyze the impairments relative to the tone in the signal received at the far end. A preferred instrument for operating on the test tone and disturbances at the receiving end of the channel is disclosed in my U.S. Pat. No. 3,814,868, entitled "Telephone Line Characteristic Measuring Instrument" which issued on June 4, 1974, which patent is hereby incorporated by reference. Such an instrument, and competing instruments which are on the market, of necessity are relatively expensive and require trained personnel to operate them.

When testing a communication transmission facility, it is often desired to obtain test results for only a portion of the transmission path. A common situation of this type is the testing of a channel between points A and B, where the test instrument and the personnel for operating it are located at point A. What is done in such a case is to apply the test tone at point A for transmission to point B, and then to re-transmit the received signal from point B back to point A where it can be operated upon, the "loopback" being accomplished typically over a 4-wire connection. Such loopback testing is often used where the test instrument and trained personnel are not available at point B. Unfortunately, however, the disturbances in the received signal which are operated upon by the test instrument at point A are those introduced in both the forward and return paths. Very often it is necessary to determine the characteristics of only one of the paths (i.e., one of the two one-way channels in the overall looped-back channel), and in conventional loopback testing there is no way to isolate the forward-path and return-path disturbances from each other.

There are other situations in which it is also necessary to test only a portion of an overall transmission channel even though the test signal is being transmitted over the entire channel. For example, consider the case in which the channel between points A and B is to be tested, but the test instrument and its operator are located at point C. Most telephone central offices are equipped with test tone generators, and thus it is a simple enough matter to have someone at location A connect a test tone generator to the channel. If a connection is established between points B and C, what will be received at point C for analysis are the test tone and the disturbances introduced by both portions of the channel, i.e., that between points A and B, and that between points B and C. Since there is no way to distinguish between the disturbances introduced by the two individual channels, it may be difficult to determine the nature of any trouble which exists along the channel between points A and B.

It is a general object of my invention to provide an apparatus and method for facilitating the measurement of the characteristics of only a selected portion of a communication channel.

Briefly, in accordance with the principles of my invention, an apparatus is placed in the overall channel at the receive end of that portion to be tested, and a tone generator is placed at the transmit end. In the examples described above, the apparatus of the invention would be placed at point B for operating on the received signal at the far end of the channel portion of interest before it is re-transmitted back to point A (where the test instrument is located at the site of the test tone generator), or transmitted onward to point C (where the test instrument is located at some site other than that of the test tone generator). The apparatus of the invention operates on the received signal at the receive end of the channel segment of interest in such a manner that even after subsequent transmission to the test instrument, the disturbances in the final signal relative to the test tone are due primarily to the distortion introduced in the transmission from point A to point B.

The apparatus of the invention is relatively inexpensive. Just as test tone generators are universally available, it is envisioned that the apparatus of the invention can be made universally available as a standard part of a telephone facility. This will allow expensive test instruments and trained personnel to be located at relatively few locations comparable to point C in the above example. For an operator at point C to conduct a test of a channel connected between points A and B, all that is required is an instruction to a person at point A to connect a test tone generator to the channel, and an instruction to someone at point B to connect the far end of the channel of interest to the input of the apparatus and the output of the apparatus to another channel connected between points B and C. These connections may, with suitable hardware arrangements, be set up automatically under remote control from the test instrument site.

When a test tone is transmitted along the channel, several kinds of distortion are introduced as described in my above-identified patent. What is received can be thought of as the test tone itself together with "disturbances." Alternatively, the disturbances are referred to as "notched noise," that is, the noise which remains after the test tone is "notched" out from the overall received signal.

The present invention is predicated on the concept of amplifying the notched noise at the remote end of the channel (point B) and then transmitting the amplified notched noise to the test instrument. While additional disturbances are introduced between points B and C, they are small compared with the amplified noise between points A and B. This approach in itself, however, is not sufficient because all that would be received at point C would be noise without the test tone. Several important measurements made by conventional test instruments are dependent upon the phase and amplitude of the disturbance component relative to the test tone in the received signal, and without the test tone being extended to point C these tests cannot be made.

Therefore, in accordance with the principles of my invention, the apparatus at point B transmits the received tone onward to point C together with the amplified notched noise. But the notched noise is amplified relative to the test tone. The same kind of tone-related disturbances which are introduced between points A and B are introduced between points B and C. But even if the test tone level itself is the same on both parts of the overall channel, because the notched noise at point B is amplified relative to the tone, it is the major factor in the overall noise received at point C and thus for all practical purposes the subsequent tests measure the characteristics of the channel between points A and B. (Similarly, if the notched noise received at point B is not amplified, but the received test tone is attenuated, the resulting tone-related disturbances introduced by the channel between points B and C will be small relative to the notched noise at point B (as received at point C).)

It has been found that a relative amplification factor of two between the notched noise and the test tone received at point B is sometimes adequate, and there is rarely a need to use a relative amplification factor in excess of five. The reason why this is so is that in the usual case the noise components introduced by the two portions of the channel are uncorrelated. The measurements made by typical test intruments are functions of the power of individual disturbance components. In terms of power, the overall notched noise signal received at point C is equal to the square root of the sum of the squares of the two individual notched noise components. If one component is two times greater than the other in magnitude, and the two components are uncorrelated, the relative power contributions of the two components have a ratio of 4:1. It is apparent that a relative amplification factor of only two between the notched noise and the test tone received at point B is sufficient to appreciably "mask out" the disturbances introduced between points B and C, even though the test tone is transmitted onward from point B to point C.

There are several ways to enhance the notched noise received at the far end of the channel relative to the received test tone prior to the transmission over another channel to the test instrument. One way is to completely separate the test tone from the notched noise, to amplify the notched noise or to attenuate the test tone, and then to add the two of them together. Another way is to extract the notched noise from the overall received signal, and to add some multiple of it to the overall received signal prior to transmission to the test instrument, or even to duplicate the received test tone to subtract some fraction of it from the overall signal.

But no matter how the relative amplification or attenuation is accomplished, it is important that the isolation of the test tone or the notched noise from the composite signal be highly selective. For example, if the test tone is to be eliminated from the composite signal so that all that remains is the notched noise (which subsequently may be amplified and then added to the composite signal), what should be filtered out of the composite signal should be only a very narrow band of frequencies around the test tone, for example, 5–10 Hz. Otherwise, the notched noise signal itself will be changed by the apparatus at point B. In this regard, the techniques described in my above-identified patent can be utilized to great advantage for they allow what are in effect very narrow filters to be constructed, as will be described in detail below. If a conventional fixed-frequency notched filter is used to separate the test tone from the disturbances, not only is the characteristic exhibited by such a filter relatively wide, but the filter tends to distort phase relationships between the disturbances and the tone, and it also tends to attenuate some of the disturbance components which are close in frequency to the test tone. It is for this reason that my aforesaid techniques — which are more accurately described as involving subtraction, rather than filtering — are preferred because they allow very narrow non-distorting notches of only a few Hz bandwidth to be provided.

Further objects, features and advantages of my invention will become apparent upon consideration of the following detailed description in conjunction with the drawing, in which:

FIG. 1 depicts a typical test set-up in which the apparatus of the present invention is employed; and FIGS. 2–5 depict four illustrative embodiments of the invention.

A typical test set-up utilizing the apparatus of my invention is depicted in FIG. 1. A test tone generator 10 is connected to one end of transmission channel 12, it being this transmission channel whose characteristics are to be measured. The test tone generator (at point A in the examples above) applies a pure tone of the form cos(wt) to the channel. At the far end (point B in the examples above), the received signal is of the form $G_1 cos(wt)+NN1$. The term $G_1$ is the factor by which the test tone is attenuated as it is transmitted along the channel of interest. The term NN1 represents all of the disturbances introduced by the channel on the test tone. The apparatus 14 of my invention is placed at the far end of the channel. As shown in FIG. 1, the apparatus is referred to as a "remote processor" because it is placed at the remote end of the channel and it processes the received signal. The apparatus generates at its output a signal having two components as shown in FIG. 1. The first component is simply a replica of the test tone, cos(wt). The second component is the notched noise NN1, multiplied by a factor $(K/G_1)$. Typically, the ratio of the noise level to the test tone level at the output of the apparatus is 2–5 times greater than the ratio at the input of the processor. (The upper limit is determined by test instrument measurements; the test circuits must not saturate.)

The processed signal is then transmitted over channel 16 to a test instrument 18, the test instrument being that disclosed in my above-identified patent or any of many other commercially available instruments. (The test instrument is located at point C in the examples described above, although point C can be the same as point A if, for example, channels 12 and 16 comprise a 4-wire duplex channel.) The test tone component is attenuated by factor $G_2$. The notched noise component $(K/G_1)(NN1)$ is attenuated by a factor $G_2(w)$. The attenuation of the notched noise signal component is a function of frequency since different frequencies are attenuated to different degrees in a typical communication channel. The third component, as shown in FIG. 1, in the received signal at the test instrument is NN2, the total disturbance on the test tone introduced by channel 16.

There are two important things to observe about the composite signal operated open by the test instrument. First, not only is a replica of the original test tone present in the signal, but the ratio of the noise to the tone at the output of remote processor 14 is K times the ratio at the input. This permits the test instrument to determine phase and amplitude information of the notched noise with respect to the tone, as they are received at the input of the remote processor, information which is of great significance especially in data communication. The second point of interest is the factor K by which the term NN1 is multiplied. Even if the levels of NN1 and NN2 are the same, the NN1 component is much larger in the overall received signal because of the amplification introduced by the remote processor. (To the extent that the frequency responses of the two channels are the same, $G_2(w)$ does not affect the measurements. It is therefore preferable that the test tone frequency be mid-band where the frequency responses are both relatively flat.)

One form of remote processor is shown in FIG. 2. The apparatus operates on the $G_1\cos(wt)+NN1$ signal at the remote end of channel 12 to generate and apply to channel 16 a signal of the form $\cos(wt)+(K/G_1)(NN1)$. The incoming signal is applied to automatic gain control circuit 20. The gain A of this amplifier varies with the DC level at its control input. The value of the gain will be described below. The output of amplifier 20 is applied to one input of frequency phase lock circuit 28. Voltage controlled oscillator 30 generates two signals $\sin(wt)$ and $\cos(wt)$. The sine signal is applied to the second input of frequency phase lock circuit 28, and the output of this circuit is applied to the control input of the voltage controlled oscillator. The operation of this type of circuit is well known to those skilled in the art. Briefly, the frequency phase lock circuit functions to multiply its two inputs. The NN1 components in the output of amplifier 20 are uncorrelated with the sine wave at the output of oscillator 30. Consequently, the product of the two signals averages out to be zero and is stripped out by the low-pass filter at the output of circuit 28 (or the input of circuit 30). The effective output of frequency phase lock circuit 28 controls the voltage controlled oscillator so that the product of the two terms $\sin(wt)$ and $G_1\cos(wt)$ has a zero DC component. If the frequencies or phases are different, the output is positive or negative. The output is applied to the control input of the voltage controlled oscillator and varies the frequency and phase of the oscillator in a direction which tends to return the output of circuit 28 towards zero. The frequency phase lock circuit and the voltage controlled oscillator thus comprise a feedback path and function to control the frequency and phase of the test tone. (Hereinafter, references to a frequency match are to be taken as a match in phase as well.) It is important for the subsequent processing to generate an exact replica of the test tone. (If more than one test tone is to be transmitted, the voltage controlled oscillator must have a wide range of operation. As is known in the art, it is possible to provide circuitry for operating in both acquisition and tracking modes.)

The $\cos(wt)$ signal generated by oscillator 30 is applied to the minus input of difference amplifier 22, the output of amplifier 20 being extended to the plus input of the amplifier. The resulting signal at the output of difference amplifier 22 is that shown in FIG. 2, and reduces to $[G_1A-1]\cos(wt)+A$ (NN1).

The output of the difference amplifier is applied to one input of multiplier 24, the $\cos(wt)$ signal from oscillator 30 being applied to the other input. The output of the multiplier is as shown in FIG. 2, each term in the output of difference amplifier 22 being multiplied by $\cos(wt)$. Recalling that $\cos^2(wt)=(\frac{1}{2})+(\frac{1}{2})\cos(2wt)$, the multiplied output can be rewritten as $(\frac{1}{2})[G_1A-1]+(\frac{1}{2})[G_1A-1]\cos(2wt)+A(NN1\cdot\cos(wt)$.

This signal is applied to the input of integrator 26. The integrator, typically an operational amplifier with a capacitor in the feedback path, functions as a low-pass filter with high DC gain. The $\cos(wt)$ and $\cos(2wt)$ components in the multiplier output are thus not passed through the integrator; the integrator output is essentially equal to the integral of $(\frac{1}{2})[G_1A-1]$, and it is this signal which is applied to the gain control input of amplifier 20. The amplifier gain is varied by the control signal. The overall loop functions to vary the gain A of amplifier 20 such that the DC component of the integrator input tends to be zero. Since this input is $(\frac{1}{2})[G_1A-1]$, the effect of the loop is to force $G_1A$ to be equal to unity. Thus, the gain A of amplifier 20 is automatically adjusted to be equal to $1G_1$. The AGC loop and the phase lock loop operate simultaneously. The output of the phase lock circuit varies with the magnitudes of its two inputs, but the only time that the output is zero is when the frequency of oscillator 30 is the same as that of the test tone. When both loops are nulled, the AGC loop causes the phase lock loop sensitivity to be independent of input signal level.

Referring to FIG. 2 and the equation for the signal at the output of difference amplifier 22, the first term in the reduced expression is zero since $[G_1A-1]$ equals zero. Consequently, the input to amplifier 34 is equal to $(1/G_r)(NN1)$. This signal is multiplied by a fixed factor K in amplifier 34, and the resulting signal is applied to one input of summer 36. The other input to the summer is the $\cos(wt)$ signal. The output applied to channel 16 is thus $\cos(wt)+(K/G_1)(NN1)$, as shown in FIG. 2. If the level of oscillator 30 is the same as that of the test tone generator, the test tone which is transmitted from the remote processor has the same level as that applied by the test tone generator to channel 12, no matter how the test tone is attenuated as a result of its transmission along channel 12. (In and of itself, this is not of paramount importance because the exact level of the test tone applied to channel 16 does not generally affect the test measurements; what is important is that the test tone be present together with the disturbances in the overall received signal, in a ratio increased by the factor K, so that phase and amplitude measurements may be made relative to it.) The significant aspect of the signal applied to channel 16 by the remote processor is that the notched noise component of the signal operated upon the processor is amplified relative to the received test tone. It is this enhancement of the disturbances relative to the test tone that "masks out" the disturbances on the test tone introduced by the transmission from the remote processor to the test instrument.

There are two distinct functions performed by the circuit of FIG. 2 which require differentiation. One relates to the local generation of a tone whose frequency is identical to that of the test tone transmitted down channel 12. It is circuits 28 and 30 which do this. The second function relates to the elimination of the test tone in the received signal from its disturbances. This is accomplished by difference amplifier 22, together with automatic gain control circuit 20, and elements 24 and 26 which derive the feedback signal. The difference amplifier can subtract the test tone from the composite signal only after the locally-generated tone and the test tone component in the composite signal have the same magnitude, and equal magnitudes are controlled by the automatic gain control circuit. It is by subtracting the correct-magnitude tone from the composite received signal that the NN1 component can be isolated for subsequent amplification. Instead of using a notched fixed-frequency filter to eliminate the test tone from the composite signal, a subtraction operation is performed because a conventional fixed-frequency filter, in addition to eliminating the test tone from the composite signal, will also affect the relative phases of the disturbances and test tone.

In the embodiment of the invention shown in FIG. 3, a slightly different arrangement is provided for controlling the local generation of a tone whose frequency is the same as that of the transmitted test tone. Furthermore, rather than to utilize an automatic gain control circuit for operating on the composite signal so that its test tone component will be equal to the magnitude of the locally-generated tone, an automatic gain control circuit is used to operate on the locally-generated tone to change its magnitude to equal that of the test tone component in the composite signal received on channel 12.

The composite signal is applied to an input of automatic gain control circuit 50. This circuit is an "absolute level" automatic gain control circuit and simply insures that the level of its output is scaled for proper operation of the phase lock loop. The exact level is not important. The voltage controlled oscillator 56 generates two tones in quadrature. The $\sin(wt)$ signal is applied to the second input of multiplier 52. As described above in connection with the frequency phase lock circuit 28 (which for all intents and purposes is a multiplier), the DC level at the output of multiplier 52 is a function only of the product of $\sin(wt)$ and the $G_1 \cos(wt)$ component in the composite input signal, after amplification by circuit 50. Integrator 54 averages out the high-frequency components in the multiplier output, and provides high DC gain. The output of the integrator is a DC level whose polarity changes depending upon the relative magnitudes and frequencies of the transmitted test tone and the locally-generated tone, and which is stable only when the integrator input is zero, i.e., when the two frequencies are the same. This output of the integrator, applied to the control input of the voltage controlled oscillator, causes the oscillator to operate at a frequency identical to that of the transmitted test tone.

Difference amplifier 60 in FIG. 3 serves the same function as difference amplifier 22 in FIG. 2. But instead of applying the locally-generated tone directly to one input of the difference amplifier and the received signal (after being operated upon by an automatic gain control circuit) to the other input, in the circuit of FIG. 3 it is the composite signal which is applied directly to one input of the difference amplifier and the locally-generated tone which is applied to the other input after first passing through an automatic gain control circuit of variable gain $G_1$. The output of the difference amplifier and the locally-generated $\cos(wt)$ signal are multiplied by multiplier 62, and the output of the multiplier then passes through integrator 64 to the control input of amplifier 58. The operation of the circuit is similar to that described in connection with FIG. 2, the gain of amplifier 58 being automatically adjusted to control the elimination of the $\cos(wt)$ term from the output of the difference amplifier. This requires a gain of $G_1$ so that the level of the $\cos(wt)$ signal applied to the minus input of the difference amplifier is equal to the level of the received test tone in the composite signal.

The only component in the output of the difference amplifier is the NN1 term which is amplified by a factor $(K-1)$ by amplifier 66. The amplified signal is applied to one input of summer 68, and the received composite signal is applied to the other input. The sum of the two terms is as shown in FIG. 3, namely, $G_1\cos(wt)+K(\text{NN1})$. This final signal is the same as that derived by the apparatus of FIG. 2, except that the signal is multiplied by the factor $G_1$. Once again, the noise-to-tone ratio at the processor output is K times the ratio at the input. The test tone is transmitted with exactly the same phase and amplitude as it is received, and the disturbances NN1 are amplified by a known factor K and then transmitted.

For the reasons described above, fixed-frequency filters are not the preferred way to separate the received test tone and the received disturbances. Instead, the utilization of a subtraction technique is far more effective in eliminating the test tone from the composite signal without at the same time modifying the disturbances. The subtraction technique can be thought of as involving the use of a "tracking filter," the circuit of FIG. 3 in such a case reducing to the equivalent circuit of FIG. 4. Tracking filter 40 in FIG. 4 has a center frequency which tracks the main input frequency. The tracking filter generates internally a signal whose amplitude is equal to the main input frequency but which has a phase shift of 180 degrees, this phase-shifted signal then being subtracted from the composite input.

In the circuit of FIG. 4, the received signal on channel 12 is applied to the input of tracking filter 40. The filter in effect strips the test tone from the composite signal and only the disturbances NN1 appear at its output. The disturbances are multiplied by $(K-1)$ in amplifier 66 and applied to one input of summer 68. The input signal is applied directly to the other input of the summer and the resulting signal applied to channel 16 is of the same form as that generated by the apparatus of FIG. 3.

In the description of the system of FIG. 2, it was assumed that the level of the locally-generated tone is the same as that of the test tone generator at the near end of channel 12, and the test tone applied to channel 16 is equal to the level of the oscillator output. To check the line from the remote processor and to determine the received tone level at the remote processor, it is desirable to transmit the locally-generated tone at reference level without any of the NN1 disturbances. The embodiment of the invention depicted in FIG. 5 shows a slightly different way in which the received disturbances can be enhanced relative to the received test tone, and it also features a signalling technique for controlling the application to channel 16 of just the locally-generated tone at reference level.

Figure 5:
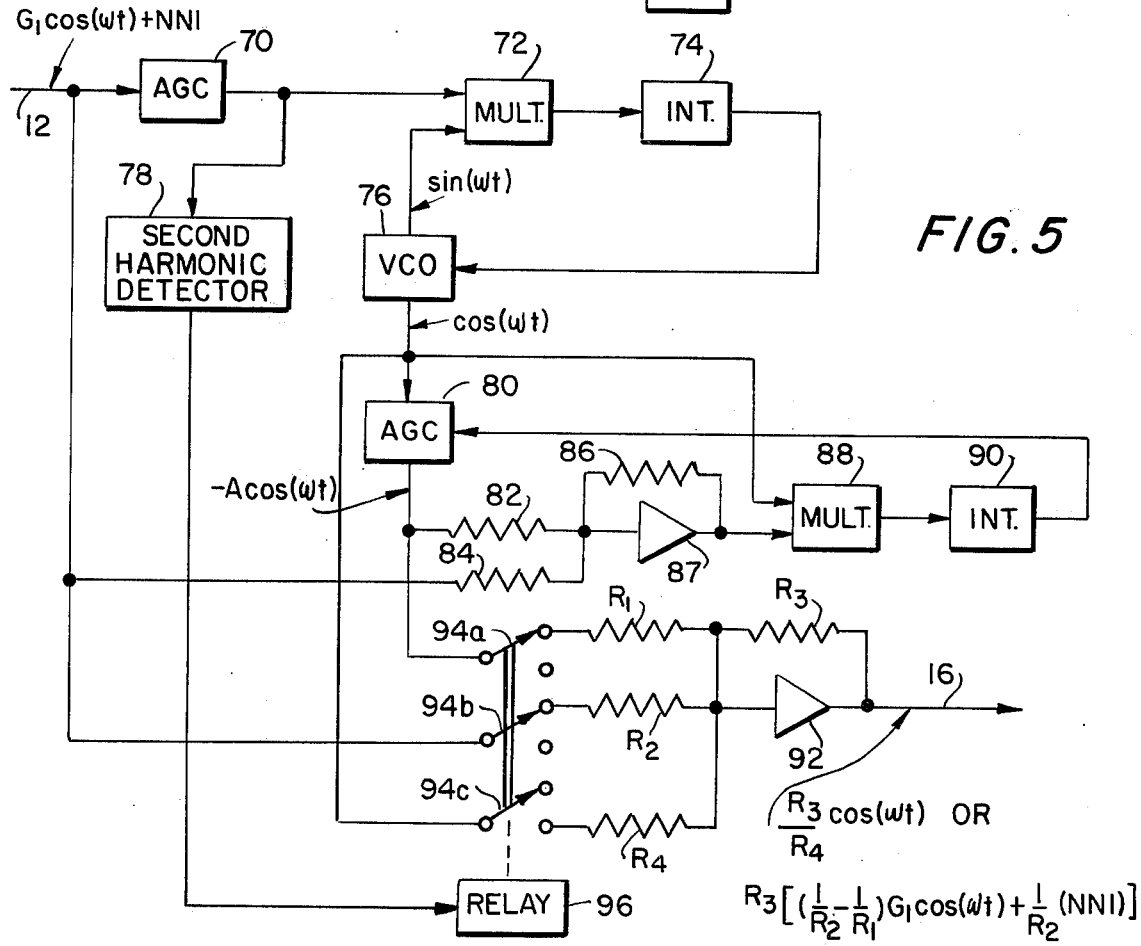

In the system of FIG. 5, the received signal is transmitted through absolute-level automatic gain control circuit 70 to an input of multiplier 72. Circuits 70, 72, 74 and 76 in FIG. 5 are comparable to circuits 50, 52, 54 and 56 in FIG. 3. In both cases, a test tone is locally generated whose frequency is identical to that of the received test tone.

In the system of FIG. 3, the locally-generated $\cos(wt)$ signal is applied through automatic gain control circuit 58 to the minus input of difference amplifier 60, and the received signal is applied to the plus input. Instead of using a difference amplifier in the system of FIG. 5, a slightly different circuit is used to perform the same subtraction operation (after making the two $\cos(wt)$ components equal in magnitude). Automatic gain control circuit 80 in the system of FIG. 5 has a negative gain A. Resistors 82 and 84, together with operational amplifier 87 and feedback resistor 86, comprise a summer, the output of the operational amplifier being comparable to that shown at the output of difference amplifier 60 in FIG. 3. Multiplier 88 operates on the locally-generated $\cos(wt)$ signal and the output of operational amplifier 87 (this output really being a difference due to the negative gain of amplifier 80), and the multiplier output is then amplified and filtered by integrator 90 to derive the control signal for amplifier 80. The overall feedback circuit is comparable to that shown in FIG. 3, the net result being that the negative gain of automatic gain control circuit 80 is adjusted to be equal to $G_1$. Consequently, the output of the automatic gain control circuit is a tone whose magnitude is the same as that of the test tone component in the composite received signal, but whose phase is the opposite.

The output of amplifier 80 is applied to the input of switch 94a, and the signal received on channel 12 is applied to the input of switch 94b. The three switches 94a, 94b and 94c are ganged together and their positions are controlled by relay 96. During normal testing, the relay is de-energized and the switches are in the positions shown. Resistors $R_1$, $R_2$, and $R_3$, together with operational amplifier 92, function as an adder. As is known in the art, the resulting signal at the output of the operational amplifier is equal to the sum of the signal applied to switch 94a multiplied by the factor Rhd 3/$R_1$, and the signal applied to switch 94b multiplied by the factor $R_3/R_2$. Recalling that the gain of amplifier 80 is adjusted such that $A=G_1$, when the system is operated in its normal mode, the signal applied to channel 16 is as shown in FIG. 5, namely, $R_3[(1/R_2-1/R_1)G_1\cos(wt)+(1/R_2)(NN1)]$. Depending on the values of resistors $R_1$, $R_2$ and $R_3$, the level of the NN1 term in the resulting signal can be enhanced relative to the level of the test tone, due to the fact that the two components of the test tone added together have opposite polarities. In effect, the input tone is tracked and reconstructed, and then part of the input tone in the received signal is cancelled by applying an out-of-phase, smaller magnitude tone of the same frequency to one input of the output summer. The output stage also provides gain ($R_3/R_2$) for the notched noise.

It should be noted that the output of amplifier 80 is made equal in magnitude to the tone component in the received signal by virtue of the feedback loop used to control the automatic gain control circuit. It is possible to omit the automatic gain control circuit. That would necessarily affect the relative levels of the notched noise and test tone applied to channel 16 by the apparatus, depending upon the relative amplitudes of the outputs of oscillator 76 and the actual level of the signal received over channel 12. Although a large relative enhancement of the noise compared to the test tone could still be achieved (with similar remarks applying to the other embodiments of the invention as well), there would be no fixed enhancement factor and this would limit the amount of useful information which could be extracted at the test instrument site.

When an operator at the test instrument site desires that the locally-generated test tone be applied to channel 16, he controls the transmission of a special signal to the apparatus of FIG. 5. This signal is illustratively a second harmonic of the basic test tone. The second harmonic is detected by second harmonic detector 78, and relay 96 is operated. All three switches 94a, 94b and 94c switch positions. At this time, no signals are applied to the inputs of resistors $R_1$ and $R_2$. Instead, the output of voltage controlled oscillator 76 is applied through switch 94c to one end of resistor $R_4$. Thus the signal applied to channel 16 is, as indicated on FIG. 5, $(R_3/R_4)\cos(wt)$. Since the factor $R_3/R_4$ is known, the signal applied to the channel is a known fraction of the locally-generated tone level. The gain of the return path (remote processor to test instrument site) can then be calibrated and since the tone source is "pure," i.e., unimpaired by notched noise, the return path quality can be checked to make certain that its impairments are indeed small enough to be masked by the factor K. Instead of transmitting the output tone from the voltage controlled oscillator while it remains locked to the received test tone, the operation of relay 96 may be made also to "break" the connection between integrator 74 and the oscillator. In such a case, by allowing the oscillator to run freely, any low-frequency phase jitter on the received test tone will not cause the oscillator to track it and otherwise "wobble" the returned tone.

The advantage of this kind of signalling is that the equipment at both ends of the channel of interest contain tone generators, and it is relatively simple to generate the harmonics of a tone. (A 70-ohm resistor in series with a 1N914 diode, placed across the output of a 600-ohm output impedance tone source feeding a 600-ohm load at 0 dbm, produces approximately −20 db of second harmonic.) Consequently, the same tones which are used for test purposes can be used for signalling purposes, and in the illustrative embodiment of the invention can actually be used to control tests on the test tones themselves. Second harmonic detector 78 in FIG. 5 is a conventional tone detector, such as those used throughout the telephone industry, for detecting a tone whose frequency is twice that of the test tone. Third harmonics may be generated and detected with similar simplicity.

When the signalling scheme described above is used, the level of the second harmonic transmitted over channel 12 should be much higher than the level of any expected second harmonic distortion introduced by the transmission facility, and second harmonic detector 78 must be designed to respond only to a second harmonic which exceeds this level. Otherwise, the second harmonic detector might respond to second harmonic distortion which results from the transmission of the test tone. Typically, detector 78 should respond only to a second harmonic whose amplitude is at least 3 db higher than that of the largest second harmonic which is anticipated as a result of the transmission of the test is anticipated as a result of the transmission of the test tone.

It is possible to combine or to switch several of the features included in the individual illustrative embodiments of the invention. The difference signal can be derived by placing the automatic gain control circuit before either input of the difference amplifier, i.e., by using the feedback loop to control the amplification of either the locally-generated tone or the received signal. It is not necessary to totally eliminate the best tone from the difference signal, just to reduce its level relative to the disturbance level since the final output is to contain a test tone component. And once the difference signal is derived with its disturbance component enhanced relative to its tone component, if the test tone level is not too low for adequate transmission to the test instrument, the difference signal itself may be used as the output. Alternatively, the difference signal may be added to the locally-generated tone, or to the received signal, or even to both.

Although the invention has been described with reference to particular embodiments, it is to be understood that these embodiments are merely illustrative of the application of the principles of the invention. For example, instead of utilizing multipliers for multiplying sine and cosine, or cosine and cosine, signals, synchronous detectors can be used. In such a case, however, because synchronous detectors give rise to odd harmonic offsets, the detectors should include filters for rejecting any in-band harmonics, usually third harmonics. It should also be noted that the factor K by which the notched noise component in the received signal is enhanced relative to the test tone may be varied if desired. The noisier the channel between the apparatus of the invention and the test instrument, the greater the need for a large value of K. It is possible to increase K in steps until the detected disturbances with two different values of K have nearly the same ratio of levels as the ratios of the values of K, in which case it is known that the detected disturbance (for either value of K) is due almost exclusively to the notched noise received at the remote end of channel 12. At the test instrument site, the disturbances can be attentuated by the factor K before measurements are taken, or the measurements may first be taken and the results reduced by the same factor. Thus it is to be understood that numerous modifications may be made in the illustrative embodiments of the invention and other arrangements may be devised without departing from the spirit and scope of the invention.

What I claim is:

1. Apparatus for processing a signal consisting of test tone and disturbance components received on a first channel and for applying the processed signal consisting of tone and disturbance components to a second channel extended to a test instrument comprising means for generating a tone whose frequency and phase are the same as those of the received test tone, and means for operating on the received signal and the generated tone for deriving said processed signal in which the ratio of the level of the disturbance component to the level of the tone component is greater by a predetermined factor of at least two than the ratio of the level of the disturbance component to the level of the test tone component in the received signal, and the relative phases of the tone and disturbance components are the same as those in the received signal.

2. Apparatus in accordance with claim 1 wherein said tone generating means includes an oscillator, and means responsive to the output of said oscillator and the received signal for generating a control signal, said control signal being extended to said oscillator to control its frequency and phase to be equal to those of the test tone in the received signal.

3. Apparatus in accordance with claim 2 wherein said operating means includes means for amplifying the received signal, means for subtracting the generated tone from the amplified received signal to derive a difference signal, means responsive to both said difference signal and said generated tone for controlling the gain of said amplifying means to cancel any tone component from said difference signal, means for amplifying said difference signal, and means for adding the amplified difference signal to said generated tone.

4. Apparatus in accordance with claim 2 wherein said operating means includes means for amplifying the generated tone, means for subtracting the amplified generated tone from the received signal to derive a difference signal, means responsive to both said generated tone and said difference signal for controlling the gain of said amplifying means to cancel any tone component from said difference signal, means for amplifying said difference signal, and means for adding the amplified difference signal to the received signal.

5. Apparatus for accordance with claim 2 wherein said operating means includes means for amplifying at least one of said received signal and generated tone, means for subtracting the amplified one of said received signal and generated tone from the other to derive a difference signal, means responsive to both said difference signal and said generated tone for controlling the gain of said amplifying means to reduce the level of the tone component relative to the level of the disturbance component in said difference signal, means for amplifying said difference signal, and means for adding the amplified difference signal to at least one of said received signal and generated tone.

6. Apparatus in accordance with claim 5 further including means responsive to the detection of a harmonic of the test tone in the received signal which exceeds a predetermined magnitude for removing the processed signal from said second channel and for applying thereto a signal proportional to the generated tone.

7. Apparatus in accordance with claim 1 further including means responsive to the detection of a harmonic of the test tone in the received signal which exceeds a predetermined magnitude for removing the processed signal from said second channel and for applying thereto a signal proportional to the generated tone.

8. Apparatus in accordance with claim 1 wherein said operating means includes means for amplifying the received signal, means for subtracting the generated tone from the amplified received signal to derive a difference signal, means responsive to both said difference signal and said generated tone for controlling the gain of said amplifying means to cancel any tone component from said difference signal, means for amplifying said difference signal, and means for adding the amplified difference signal to said generated tone.

9. Apparatus in accordance with claim 1 wherein said operating means includes means for amplifying the generated tone, means for subtracting the amplified generated tone from the received signal to derive a difference signal, means responsive to both said generated tone and said difference signal for controlling the gain of said amplifying means to cancel any tone component from said difference signal, means for amplifying said difference signal, and means for adding the amplified difference signal to the received signal.

10. Apparatus in accordance with claim 1 wherein said operating means includes means for amplifying at least one of said received signal and generated tone, means for subtracting the amplified one of said received signal and generated tone from the other to derive a difference signal, means responsive to both said difference signal and said generated tone for controlling the gain of said amplifying means to reduce the level of the tone component relative to the level of the disturbance component in said difference signal, and means for adding the amplified difference signal to at least one of said received signal and generated tone.

11. Apparatus for processing a signal consisting of test tone and disturbance components received on a first channel and for applying the processed signal consisting of tone and disturbance components to a second channel extended to a test instrument comprising tracking filter means for operating on the received signal to derive a signal proportional thereto but with the tone component absent, means for amplifying said derived signal, and means for adding together the amplified derived signal and said received signal.

12. Apparatus for processing a signal consisting of test tone and disturbance components received on a first channel and for applying the processed signal consisting of tone and disturbance components to a second channel extended to a test instrument comprising means for operating on the received signal to derive a signal proportional thereto but with a tone level reduced relative to the disturbance level, means for amplifying said derived signal, and means for adding together the amplified derived signal and a tone having the same frequency and phase as those of the test tone contained in the received signal.

13. Apparatus in accordance with claim 12 further including means responsive to the detection of a harmonic of the test tone in the received signal which exceeds a predetermined magnitude for removing the processed signal from said second channel and for applying thereto a tone having the same frequency and phase as those of the test tone contained in the received signal.

14. A test system for testing the characteristics of a communication channel of interest comprising a test tone generator connected to one end of said channel; a remote processor having an input connected to the other end of said channel, and an output; a test instrument; and another channel connected between said output and said test instrument; said remote processor including means for generating a tone whose frequency and phase are the same as those of the test tone received at said input, and means for operating on the test tone/disturbance signal received at said output and the generated tone for deriving and applying to said output a signal in which the ratio of the level of the disturbance component to the level of the tone component is greater by a predetermined factor of at least two than the ratio of the level of the disturbance component to the level of the test tone component in the signal received at said input, and the relative phases of the tone and disturbance components are the same as those in the received signal.

15. A test system in accordance with claim 14 wherein said tone generating means includes an oscillator, and means responsive to the output of said oscillator and the signal received at said input for generating a control signal, said control signal being extended to said oscillator to control its frequency and phase to be equal to those of the test tone in the signal received at said input.

16. A test system in accordance with claim 15 wherein said operating means includes means for amplifying the signal received at said input, means for subtracting the generated tone from the amplified signal received at said input to derive a difference signal, means responsive to both said difference signal and said generated tone for controlling the gain of said amplifying means to cancel any tone component from said difference signal, means for amplifying said difference signal, and means for adding the amplified difference signal to said generated tone.

17. A test system in accordance with claim 15 wherein said operating means includes means for amplifying the generated tone, means for subtracting the amplified generated tone from the signal received at said input to derive a difference signal, means responsive to both said generated tone and said difference signal for controlling the gain of said amplifying means to cancel any tone component from said difference signal, means for amplifying said difference signal, and means for adding the amplified difference signal to the signal received at said input.

18. A test system in accordance with claim 15 wherein said operating means includes means for amplifying at least one of said signal received at said input and said generated tone, means for subtracting the amplified one of the signal received at said input and said generated tone from the other to derive a difference signal, means responsive to both said difference signal and said generated tone for controlling the gain of said amplifying means to reduce the level of the tone component relative to the level of the disturbance component in said difference signal, means for amplifying said difference signal, and means for adding the amplified difference signal to at least one of the signal received at said input and said generated tone.

19. A test system in accordance with claim 18 further including means in said remote processor responsive to the detection of a harmonic of the test tone in the signal received at said input which exceeds a predetermined magnitude for removing from said output the signal normally applied thereto and for applying instead a signal proportional to the generated tone.

20. A test system in accordance with claim 14 further including means in said remote processor responsive to the detection of a harmonic of the test tone in the signal received at said input which exceeds a predetermined magnitude for removing from said output the signal normally applied thereto and for applying instead of a signal proportional to the generated tone.

21. A test system in accordance with claim 14 wherein said operating means includes means for amplifying the signal received at said input, means for subtracting the generated tone from the amplified signal received at said input to derive a difference signal, means responsive to both said difference signal and said generated tone for controlling the gain of said amplifying means to cancel any tone component from said difference signal, means for amplifying said difference signal, and means for adding the amplified difference signal to said generated tone.

22. A test system in accordance with claim 14 wherein said operating means includes means for amplifying the generated tone, means for subtracting the amplified generated tone from the signal received at said input to derive a difference signal, means responsive to both said generated tone and said difference signal for controlling the gain of said amplifying means to cancel any tone component from said difference signal, means for amplifying said difference signal, and means for adding the amplified difference signal to the signal received at said input.

23. A test system in accordance with claim 14 wherein said operating means includes means for amplifying at least one of said signal received at said input and said generated tone, means for subtracting the amplified one of the signal received at said input and said generated tone from the other to derive a difference signal, means responsive to both said difference signal and said generated tone for controlling the gain of said amplifying means to reduce the level of the tone component relative to the level of the disturbance component in said difference signal, means for amplifying said difference signal, and means for adding the amplified difference signal to at least one of the signal received at said input and said generated tone.

24. A test system for testing the characteristics of a communication channel of interest comprising a test tone generator connected to one end of said channel; a remote processor having an input connected to the other end of said channel, and an output; a test instrument; and another channel connected between said output and said test instrument; said remote processor including tracking filter means for operating on the signal received at said input to derive a signal proportional thereto but with the tone component absent, means for amplifying said derived signal, and means for adding together and applying to said output the amplified derived signal and said signal received at said input.

25. A test system for testing the characteristics of a communication channel of interest comprising a test tone generator connected to one of said channel; a remote processor having an input connected to the other end of said channel, and an output; a test instrument; and another channel connected between said output and said test instrument; said remote processor including means for operating on the signal received at said input, said received signal having tone and disturbance components therein, to derive a signal proportional thereto but with a tone level reduced relative to the disturbance level, means for amplifying said derived signal, and means for adding together and applying to said output the amplified derived signal and a tone having the same frequency and phase as those of the test tone contained in the signal received at said input.

26. A test system in accordance with claim 25 further including means in said remote processor responsive to the detection of a harmonic of the test tone in the signal received at said input which exceeds a predetermined magnitude for removing from said output the signal normally applied thereto and for applying instead a tone having the same frequency and phase as those of the test tone contained in the signal received at said input.

27. A method for processing a signal consisting of test tone and disturbance components received on a first channel and for applying the processed signal consisting of tone and disturbance components to a second channel extended to a test instrument comprising the steps of generating a tone whose frequency and phase are the same as those of the received test tone, and operating on the received signal and the generated tone for deriving said processed signal in which the ratio of the level of the disturbance component to the level of the tone component is greater by a predetermined factor of at least two than the ratio of the level of the disturbance component to the level of the test tone component in the received signal, and the relative phases of the tone and disturbance components are the same as those in the received signal.

28. A method in accordance with claim 27 further including the steps of detecting a harmonic of the test tone in the received signal which exceeds a predetermined magnitude, and in response thereto removing the processed signal from said second channel and applying instead a signal proportional to the generated tone.

29. A method for processing a signal consisting of test tone and disturbance components received on a first channel and for applying the processed signal consisting of tone and disturbance components to a second channel extended to a test instrument comprising the steps of operating on the received signal to derive a signal proportional thereto with the tone component level reduced relative to the disturbance component level, amplifying said derived signal, and adding together and applying to said second channel the amplified derived signal and said received signal.

30. A method in accordance with claim 29 further including the steps of detecting a harmonic of the test tone in the received signal which exceeds a predetermined magnitude, and in response thereto removing the processed signal from said second channel and for applying instead a tone having the same frequency and phase as those of the test tone contained in the received signal.

31. A method for testing the characteristics of a communication channel of interest comprising the steps of transmitting a test tone from one end of said channel to the other; processing the received signal at said other end; and transmitting the processed signal over another channel to a test instrument; said processing step including the substeps of generating a tone whose frequency and phase are the same as those of the received test tone, and operating on the received test tone/disturbance signal and the generated tone for deriving and applying to said other channel a signal in which the ratio of the level of the disturbance component to the level of the tone component is greater by a known factor of at least two than the ratio of the level of the disturbance component to the level of the test tone component in the received signal, and the relative phases of the tone and disturbance components are the same as those in the received signal.

32. A method in accordance with claim 31 wherein said processing step further includes the sub-steps of detecting a harmonic of the test tone in the received signal which exceeds a predetermined magnitude, and in response thereto removing from said other channel the signal normally applied thereto and applying instead a signal proportional to the generated tone.

33. A method for testing the characteristics of a communication channel of interest comprising the steps of transmitting a test tone from one end of said channel to the other; processing the received signal at said other end; and transmitting the processed signal over another channel to a test instrument; said processing step including the sub-steps of operating on the received signal, said received signal having tone and disturbance components therein, to derive a signal proportional thereto but with the tone component level reduced relative to the disturbance component level, amplifying said derived signal, and adding together and applying to said other channel the amplified derived signal and said received signal.

34. A method for testing the characteristics of a communication channel of interest comprising the steps of transmitting a test tone from one end of said channel to the other; processing the received signal at said other end; and transmitting the processed signal over another channel to a test instrument; said processing step including the sub-steps of operating on the received signal, said received signal having tone and disturbance components therein, to derive a signal proportional thereto but with the tone component level reduced relative to the disturbance component level, amplifying said derived signal, and adding together and applying to said other channel the amplified derived signal and a tone having the same frequency and phase as those of the test tone contained in the received signal.

35. A method in accordance with claim 34 wherein said processing step further includes the sub-steps of detecting a harmonic of the test tone in the received signal which exceeds a predetermined magnitude, and in response thereto removing from said other channel the signal normally applied thereto and applying instead a tone having the same frequency and phase as those of the test tone contained in the received signal.

36. A method in accordance with claim 34 wherein said tone component is absent from said derived signal.

37. Apparatus for processing a signal consisting of test tone and disturbance components received on a first channel and for applying the processed signal consisting of tone and disturbance components to a second channel extended to a test instrument comprising means for determining the frequency and phase of the test tone in the received signal, and means responsive to said determining means for operating on the received signal to derive said processed signal in which the ratio of the level of the disturbance component to the level of the tone component is greater by a factor of at least two than the ratio of the level of the disturbance component to the level of the test tone component in the received signal, and the relative phases of the tone and disturbance components are the same as those in the received signal.

38. Apparatus for processing a signal consisting of test tone and disturbance components received on a first channel and for applying the processed signal consisting of tone and disturbance components to a second channel extended to a test instrument comprising means for operating on the received signal to derive a signal proportional thereto but with a tone level reduced relative to the disturbance level, and means for applying to said second channel a signal which is a function of said derived signal and having tone and disturbance component levels both sufficient in magnitude to enable said test instrument to determine phase information in the disturbance components relative to the test tone component in the signal received over said first channel even after transmission to said test instrument over said second channel of said applied signal.

39. Apparatus in accordance with claim 38 further including means responsive to the detection of a second harmonic of the test tone in the received signal which exceeds a predetermined magnitude for removing the processed signal from said second channel and for applying thereto a tone having the same frequency and phase as those of the test tone contained in the received signal.

40. A test system for testing the characteristics of a communication channel of interest comprising a test tone generator connected to one end of said channel; a remote processor having an input connected to the other end of said channel, and an output; a test instrument; and another channel connected between said output and said test instrument; said remote processor including means for determining the frequency and phase of the test tone received at said input, and means responsive to said determining means for operating on the test tone/disturbance signal received at said input to derive and apply to said output a signal in which the ratio of the level of the disturbance component to the level of the tone component is greater by a known factor of at least two than the ratio of the level of the disturbance component to the level of the test tone component in the signal received at said input, and the relative phases of the tone and disturbance components are the same as those in the received signal.

41. A test system for testing the characteristics of a communication of interest comprising a test tone generator connected to one end of said channel; a remote processor having an input connected to the other end of said channel, and an output; a test instrument; and another channel connected between said output and said instrument; said remote processor including means for operating on the signal received at said input, said received signal having tone and disturbance components therein, to derive a signal proportional thereto but with a tone level reduced relative to the disturbance level, and means for applying to said output a signal which is a function of said derived signal and having tone and disturbance component levels both sufficient in magnitude to enable said test instrument to determine phase information in the disturbance component relative to the test tone component in the signal received over said channel of interest even after transmission to said test instrument over said other channel of the signal applied to said output.

42. A test system in accordance with claim 41 further including means in said remote processor responsive to the detection of a harmonic of the test tone in the signal received at said input which exceeds a predetermined magnitude for removing from said output the signal normally applied thereto and for applying instead a tone having the same frequency and phase as those of the test tone contained in the signal received at said input.

43. A method for processing a signal consisting of test tone and disturbance components received on a first channel and for applying the processed signal consisting of tone and disturbance components to a second channel extended to a test instrument comprising the steps of determining the frequency and phase of the test tone in the received signal, and responsive to said determining means operating on the received signal to derive said processed signal in which the ratio of the level of the disturbance component to the level of the tone component is greater by a factor of at least two than the ratio of the level of the disturbance component to the level of the test tone component in the received signal, and the relative phases of the tone and disturbance components are the same as those in the received signal.

44. A method for testing the characteristics of a communication channel of interest comprising the steps of transmitting a test tone from one of said channel to the other; processing the received signal at said other end; and transmitting the processed signal over another channel to a test instrument; said processing step including the sub-steps of operating on the received signal, said received signal having tone and disturbance components therein, to derive a signal proportional thereto but with the tone component level reduced relative to the disturbance component level, and applying to said other channel a signal which is a function of the derived signal and having tone and disturbance component levels both sufficient in magnitude to enable said test instrument to determine phase information in the disturbance component relative to the test tone component in the signal received over said channel of interest even after transmission to said test instrument over said other channel of said applied signal.

45. A method in accordance with claim 44 wherein said processing step further includes the sub-steps of detecting a harmonic of the test tone in the received signal which exceeds a predetermined magnitude, and in response thereto removing from said other channel the signal normally applied thereto and applying instead a tone having the same frequency and phase as those of the test tone contained in the received signal.

46. Apparatus for use in testing the characteristics of a communication channel of interest comprising a test tone generator connected to one end of said channel for transmitting a test tone therealong; and a remote processor having an input connected to the other end of said channel, and an output; said remote processor including means for operating on the test tone/disturbance signal received at said input to derive and to apply to said output a signal proportional thereto but with a disturbance to tone level ratio which is greater by a factor of at least two than the disturbance to tone level ratio at said input, the relative phases of the tone and disturbance components in the signal applied to said output being the same as those in the signal received at said input.

47. Apparatus in accordance with claim 46 further including means in said remote processor responsive to the detection of a harmonic of the test tone in the signal received at said input which exceeds a predetermined magnitude for removing from said output the signal normally applied thereto and for applying instead a different tone signal.

48. Apparatus for use in the testing of the characteristics of a communication channel of interest along which a test tone is transmitted from one end thereof to the other comprising means for operating on the received test tone/disturbance signal to derive a signal proportional thereto but with a disturbance to tone level ratio which is greater by a factor of at least two than the disturbance to tone level ratio of the signal operated upon, the relative phases of the tone and disturbance components in the derived signal being the same as those in the signal operated upon, and means for applying the derived signal to another communication channel extended to a test instrument.

49. Apparatus in accordance with claim 48 further including means responsive to the detection of a harmonic of said test tone in the received signal which exceeds a predetermined magnitude for removing from said other channel the signal normally applied thereto and for applying instead a different tone signal.

* * * * *

UNITED STATES PATENT OFFICE
CERTIFICATE OF CORRECTION

Patent No. 4,021,625                    Dated May 3, 1977

Inventor(s) Frank R. Bradley

It is certified that error appears in the above-identified patent and that said Letters Patent are hereby corrected as shown below:

Column 18, line 41, "means" should read -- step --.

Signed and Sealed this thirtieth Day of August 1977

[SEAL]

Attest:

RUTH C. MASON
Attesting Officer

C. MARSHALL DANN
Commissioner of Patents and Trademarks